US008638728B2

(12) United States Patent
Luo et al.

(10) Patent No.: US 8,638,728 B2
(45) Date of Patent: Jan. 28, 2014

(54) BLIND DECODING IN A MOBILE ENVIRONMENT

(75) Inventors: Tao Luo, San Diego, CA (US); Xiaoxia Zhang, San Diego, CA (US); Kibeom Seong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1298 days.

(21) Appl. No.: 12/203,423

(22) Filed: Sep. 3, 2008

(65) Prior Publication Data

US 2009/0067378 A1 Mar. 12, 2009

Related U.S. Application Data

(60) Provisional application No. 60/970,508, filed on Sep. 6, 2007, provisional application No. 60/992,668, filed on Dec. 5, 2007.

(51) Int. Cl.
*H04W 28/00* (2009.01)

(52) U.S. Cl.
USPC ........................................................ 370/329

(58) Field of Classification Search
USPC ........................................................ 370/329
See application file for complete search history.

(56) References Cited

U.S. PATENT DOCUMENTS

2007/0072570 A1* 3/2007 Hottinen et al. ............ 455/277.2

FOREIGN PATENT DOCUMENTS

| EP | 1487117 A2 | 12/2004 |
|----|-----------|---------|
| JP | 2005175678 A | 6/2005 |

OTHER PUBLICATIONS

3rd Generation Partnership Project; Technical Specification Group Radio Access Network; Evolved Universal Terrestrial Radio Access (E-UTRA);Multiplexing and channel coding (Release 8) ,3GPP TS 36.212 V1.4.0,Aug. 2007,pp. 14-20.
3rd Generation Partnership Project; Technical Specification Group Radio Access Network; Multiplexing and channel coding, 3GPP TS 36.212 V1.3.0 Release 8 (Jul. 2007).
3rd Generation Partnership Project;Technical Specification Group Radio Access Network;Multiplexing and channel coding (FDD), 3GPP TS 25.212 V7.5.0, Release 7 (May 2007).
3GPP-RAN: "3rd Generation Partnership Project; Technical Specification Group Radio Access Network; Evolved Universal Terrestrial Radio Access (E-UTRA); Multiplexing and Channel Coding (Release 8) (3GPP TS 36.212 version 2.0.0" GPP, Sophia Antipolis Cedex, France, Sep. 1, 2007, XP002543235 cited in the application section 5.1.4, pp. 14-19.
International Search Report & Written Opinion—PCT/US2008/075292, International Search Authority—European Patent Office—Oct. 19, 2009.

(Continued)

*Primary Examiner* — Sulaiman Nooristany
(74) *Attorney, Agent, or Firm* — Liem T. Do

(57) ABSTRACT

Providing for modified rate-matching of modulated data to convey mobile network system information is described herein. By way of example, a rate-matching state, such as a data offset, can be introduced into a coded data stream that is modulated to resources of a wireless signal. The state can further be correlated to a state of the network system, such as transmit antenna configuration. Terminals receiving the wireless signal can analyze the signal to identify the rate-matching state and obtain the correlated network system state. Components of the terminal can then be configured according to the particular network system state, resulting in improving access point detection, and in some cases improved channel throughput and reliability.

17 Claims, 13 Drawing Sheets

(56) References Cited

OTHER PUBLICATIONS

"Universal Mobile Telecommunications System (UMTS); Multiplexing and channel coding (FDD) (3GPP TS 25.212 version 7.5.0 Release 7); ETSI TS 125 212" ETSI Standards, LIS, Sophia Antipolis Cedex, France, vol. 3-R1, May 1, 2007, XP014037878 ISSN: 0000-0001 section 4.2.7, pp. 24-39.

"3rd Generation Partnership Project; Technical Specification Group Radio Access Network; Evolved Universal Terrestrial Radio Access (E-UTRA); Physical Channels and Modulation" (Release 8), 3GPP TS 36.211 V2.0.0 (Sep. 2007).

Taiwan Search Report—TW097134265—TIPO—Feb. 1, 2013.

\* cited by examiner

BLIND DECODING IN A MOBILE ENVIRONMENT

CLAIM OF PRIORITY UNDER 35 U.S.C. §119

The present Application for Patent claims priority to U.S. Provisional Application No. 60/970,508 entitled METHOD AND SYSTEM FOR ENABLING EFFICIENT ANTENNA AND P-BCH BLIND DECODING IN E-UTRAN filed Sep. 6, 2007 and to U.S. Provisional Application No. 60/992,668 entitled METHOD AND SYSTEM FOR ENABLING EFFICIENT ANTENNA AND P-BCH BLIND DECODING IN E-UTRAN filed Dec. 5, 2007, each of which are assigned to the assignee hereof and hereby expressly incorporated by reference herein.

BACKGROUND

I. Field

The following relates generally to wireless communication, and more specifically to facilitating blind decoding of system information at a user terminal.

II. Background

Wireless communication systems are widely deployed to provide remote devices with various types of communication content such as, e.g., voice content, data content, and so on. These wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, third generation partnership project (3GPP) long term evolution (LTE) systems, third generation partnership project 2 (3GPP2) ultra mobile broadband (UMB) systems, orthogonal frequency division multiple access (OFDMA) systems, and like systems.

Generally, a wireless multiple-access communication system can simultaneously support communication for multiple wireless terminals. Each terminal can communicate with one or more base stations via wireless transmissions on forward and reverse links. The forward link (or downlink) refers to the communication link from base stations to terminals, and the reverse link (or uplink) refers to the communication link from terminals to base stations. Further, communication between the terminals and base stations can be established via single-input single-output (SISO) systems, multiple-input single-output (MISO) systems, multiple-input multiple-output (MIMO) systems, and so forth.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels (also referred, e.g., as spatial channels) where $N_3 \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on a same frequency region, enabling estimation of the forward link channel from the reverse link channel by way of reciprocity principles. This estimation enables an access point (e.g., base station) to extract transmit beamforming gain on the forward link when multiple antennas are available at the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for conveying network system information by adjusting rate-matching of modulated signals included in a wireless transmission. In at least one aspect of the subject disclosure, a data offset can be introduced into a coded data stream that is modulated to resources of the wireless signal. The data offset can represent a state of the network system. As one specific example, one or more data offsets can represent one or more transmission antenna configuration states (e.g., as part of a multiple-input multiple-output [MIMO] transmission system). For instance, a first data offset can represent a single transmission antenna configuration, a second data offset can represent a dual transmission antenna configuration, or a third data offset can represent a quad transmission antenna configuration, or a combination thereof or of the like. Furthermore, wireless terminals can be configured to analyze incoming wireless signals to identify modified rate-matching associated with a demodulated data stream. A rules map can correlate system information with particular rate-matching modifications. Receive antennas of the terminal can then be configured according to the particular system information, improving access point detection and channel throughput and reliability.

According to some aspects of the subject disclosure, provided is a method of wireless communications. The method can comprise segmenting a wireless signal into multiple resources. The method can further comprise conveying wireless network system information by employing at least one distinct data offset in rate matching a data stream to resources of the wireless signal.

In other aspects, provided is an apparatus configured for wireless communications. The apparatus can comprise a signal parser that segments a wireless signal into multiple resources. Additionally, the apparatus can comprise a signal processor that conveys wireless network system information by employing at least one distinct data offset in rate matching a data stream to resources of the wireless signal. Moreover, the apparatus can comprise memory coupled to the signal processor.

According to one or more other additional aspects, disclosed is another apparatus configured for wireless communications. Such other apparatus can comprise means for segmenting a wireless signal into multiple resources. Moreover, such other apparatus can comprise means for conveying wireless network system information by employing at least one distinct data offset in rate matching a data stream to resources of the wireless signal.

In still other aspects, provided is a processor configured for wireless communications. The processor can comprise a first module that segments a wireless signal into multiple resources. Additionally, the processor can comprise a second module that conveys wireless network system information by employing at least one distinct data offset in rate matching a data stream to resources of the wireless signal.

According to at least one aspect of the disclosure, provided is a computer program product (also referred to as device) comprising a computer-readable medium comprising code (also referred to as, instructions) configured for wireless communications. The instructions can be executable by at least one device to segment a wireless signal into multiple resources. The instructions can further be executable by the at least one device to convey wireless network system information by employing at least one distinct data offset in rate matching a data stream to resources of the wireless signal.

According to further aspects of the disclosure, provided is a method of detecting a wireless access point (AP). The method can comprise identifying at least one distinct data offset in one or more resources of a received wireless signal. Moreover, the method can comprise mapping the at least one distinct data offset to an offset rules map to ascertain network system information from the received wireless signal.

According to additional aspects, disclosed is a user terminal (UT) configured for detecting a wireless AP. The UT can comprise a receiver module that identifies at least one distinct data offset in one or more resources of a received wireless signal. Additionally, the UT can comprise an offset rules map that correlates data offsets to network system information and memory for storing the offset rules map. In addition to the foregoing, the UT can comprise a correlation module that ascertains a state of the network system by comparing the at least one distinct data offset to the offset rules map.

In one or more other aspects, provided is an apparatus for detecting a wireless AP. The apparatus can comprise means for identifying at least one distinct data offset in one or more resources of a received wireless signal. Further, the apparatus can comprise means for correlating data offsets to network system information. Moreover, the apparatus can comprise means for ascertaining a state of the network system from the at least one distinct data offset.

According to further aspects, disclosed is a processor configured to detect a wireless AP. The processor can comprise a first module that identifies at least one distinct data offset in one or more resources of a received wireless signal. Additionally, the processor can comprise a second module that maps the at least one distinct data offset to an offset rules map to ascertain network system information from the received wireless signal.

In addition to the foregoing, disclosed is a computer program product (also referred to as device) comprising a computer-readable medium comprising code (also referred to as, instructions) in some aspects of the subject disclosure. The instructions can be executable by at least one device to identify at least one distinct data offset in one or more resources of a received wireless signal. Moreover, the instructions can be further executable by the at least one device to map the at least one distinct data offset to an offset rules map to ascertain network system information from the received wireless signal.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
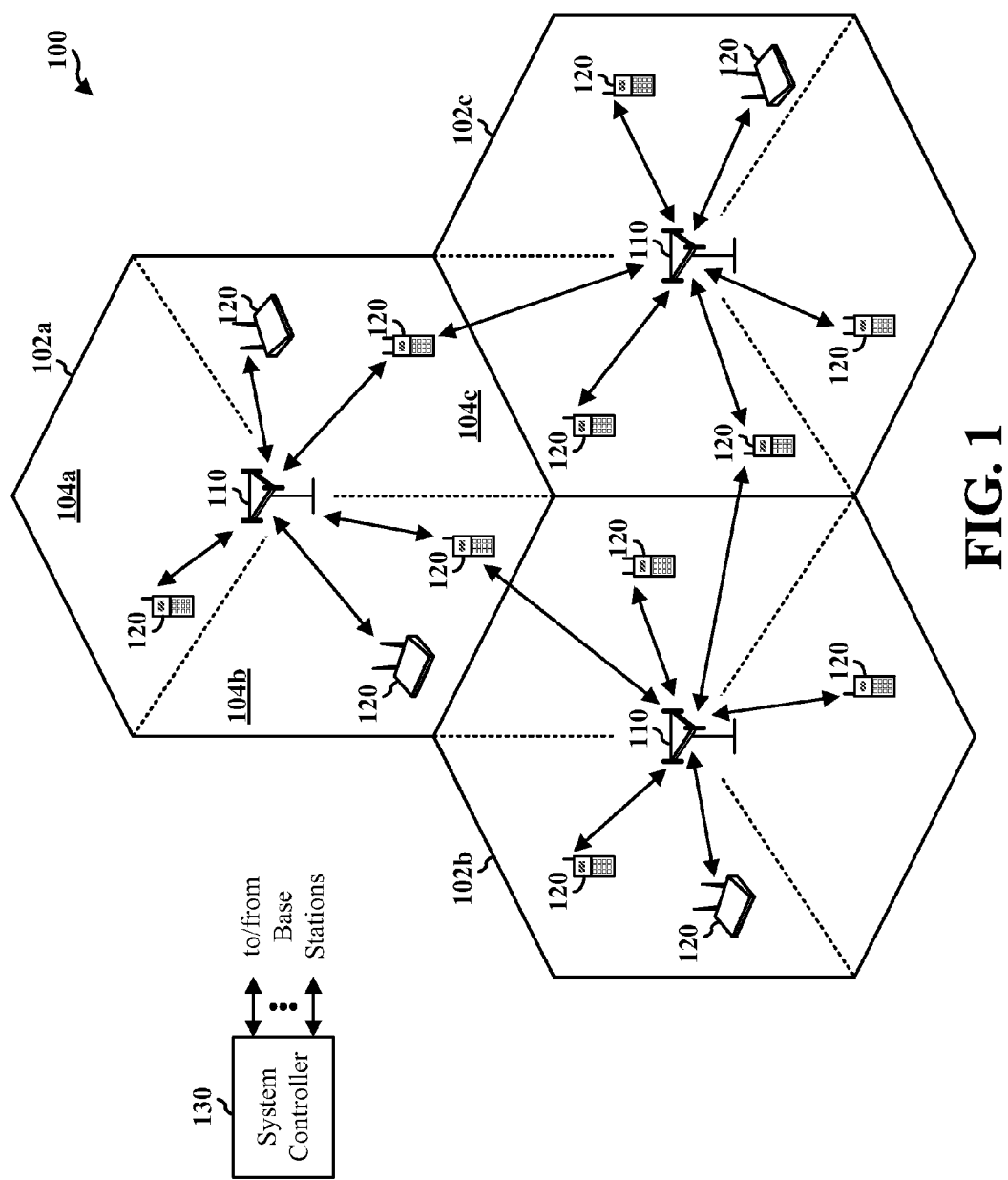
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing secure tracking and reporting of wireless resource usage at a terminal device. One skilled in the art should appreciate that similar techniques could apply to other communication environments.

To facilitate communication with remote terminals in a mobile networking arrangement, network base stations broadcast wireless signals that include synchronization and/or acquisition signals. The signals vary from one system to another (e.g., an LTE system can utilize a primary synchronization channel [PSC] and secondary synchronization channel [SSC], whereas a UMB system can utilize TDM1, TDM2, and TDM3 acquisition pilots), but typically include data that facilitates various functions pertinent to mobile communications. Examples of such functions include identifying a base station broadcasting a wireless signal and a type of system associated with the base station (e.g., LTE, UMB, etc.), providing initial timing and/or frequency data for demodulating the signal, conveying initial system parameters concerning the system (e.g., whether synchronous or asynchronous, what time division duplex [TDD] partitioning is used), and so on. In addition, wireless signals comprise control channels that provide configuration information utilized by remote terminals to register on the mobile network and communicate with the network. Paging services, utilized to notify a terminal of an inbound call, are one example of functions performed with control channel information in some systems.

Control channel and pilot information are often provided in dedicated resources (e.g., time, frequency) of a wireless signal. This provides an advantage in that receiving devices can reliably analyze predetermined resources to obtain demodulation and synchronization data concerning the wireless signal. One drawback, however, is that additional resources might not be available for other information pertinent to initial acquisition or signal synchronization. For instance, where a standard governing a mobile system provides specific resources for pilot and control information, the signal might have limited capacity to accommodate advancements in the network architecture after the standard is established. Thus, for instance, where a system evolves to have multiple acquisition/control states, transmission states, or the like, not envisioned by the standard, it can be difficult to convey system state information.

One particular problem is illustrated by blind decoding. When a mobile device first enters a macro network, system and/or channel information from the network may be necessary in order to communicate with the network. However, if the mobile device is not already acclimated with the network, some of the information might have to be decoded blindly, or without specific instruction on how to decode a channel or where system information exists within a received signal. One mechanism for blind decoding is to analyze the received signal according to multiple known states. Where a particular known state is well correlated with analyzed signals, it can be assumed that the particular state corresponds with the signal. However, this assumption can lead to false alarms, where multiple states sufficiently correlate to the analyzed signal. Multiple correlations can occur, for instance, where high signal to noise (SNR) is prevalent.

To address the foregoing problem, the subject disclosure provides for modified rate-matching techniques for broadcast signals which can be utilized to convey system information. Broadcast signals, as utilized herein, refer to downlink wireless resources that convey information to all remote devices that receive the signals. Examples of broadcast signals can include a broadcast channel (BCH), primary broadcast channel (PBCH), broadcast control channel (BCCH), downlink control channel (DL-CCH), physical downlink control channel (PDCCH) and/or like broadcast signals. By employing modified rate-matching to convey system information, additional broadcast channel resources are typically not required. Thus, for instance, a data offset can be utilized in rate-matching information that is to be blind decoded, resulting in reduced probability of false alarms, discussed above. Accordingly, the subject disclosure can be utilized with legacy mobile network modulation as well as future released mobile standards and architectures.

As one example of the foregoing, a network's transmit antenna configuration for sending a downlink signal can be conveyed utilizing modified rate-matching. This can alleviate problems with base station detection and/or blind decoding of base station signals in radio access networks. For instance, in E-UTRAN (Evolved Universal Terrestrial Radio Access Network), a user terminal blindly detects a number of transmit antennas at initial signal acquisition. The number of antennas is linked to transmit diversity modes used in sending a PBCH. For single antenna configuration, there is no transmit diversity; the signal is mapped to consecutive tones of the wireless signal. For a dual antenna configuration, space-frequency block coding scheme (SFBC) is employed to pair signals together and send each signal of the pair over one of the dual channels utilizing different tones. For a quad antenna configuration, SFBC is utilized along with frequency switch transmit diversity (FSTD) to send signals over four antennas. For different cyclic prefix and frame structure combinations, the following table shows PBCH configuration:

| Configuration | | Values of index l | |
|---|---|---|---|
| | | Frame structure type 1 | Frame structure type 2 |
| Normal cyclic prefix | $\Delta f = 15$ kHz | 3, 4 in slot 0 of subframe 0<br>0, 1 in slot 1 of subframe 0 | 3, 4, 5, 6 In subframe 0 in the first half-frame of a radio frame |
| Extended cyclic prefix | $\Delta f = 15$ kHz | 3 in slot 0 of subframe 0 | 3, 4, 5, 6 In subframe 0 in the first half-frame of a radio frame |

In order to property decode a signal and utilize communication features provided in MIMO and related systems, a user terminal typically first determines how many transmit antennas are utilized by the transmitter to send the signal. Where the number of transmit antennas is not explicitly specified in a wireless signal, a user terminal will blind decode the number of transmit antennas. Blind decoding involves correlating aspects of a received signal to parameters associated with various antenna configurations. When the user terminal identifies a configuration that is well correlated with the received signal, the terminal assumes that configuration is the proper configuration. Thus, for instance, where a received signal is well correlated with parameters associated with a dual antenna configuration, the terminal assumes a dual transmit antenna configuration.

In certain wireless environments, e.g. where a receiver obtains the wireless signal with high signal to noise ratio (SNR), multiple configurations can be well correlated with the signal, even though only one actual configuration is present. Accordingly, the terminal might decode the wrong antenna configuration in a blind decoding scenario. Thus, some explicit signaling of antenna configuration can be beneficial to improve system configuration decoding at a receiver.

Typical rate-matching of broadcast data streams (e.g. PBCH) to a wireless signal assumes the same starting frequency tone regardless of system configuration (e.g., number of transmit antennas). The subject disclosure provides for modified rate-matching to convey system configuration information. In one aspect, an offset tone (e.g., for FDMA systems), offset code (e.g., for CDMA systems), or a like resource offset can be implemented in rate-matching. Rate-matching involves coding one or more data streams into a coded stream and mapping the coded stream to resources of a wireless signal. A rate-matching offset can be implemented in various manners when mapping the coded stream to the wireless signal resources. As an example, different starting frequency tones of the coded signal can be mapped to a first resource of the wireless signal. Thus, as a specific example, modified rate-matching can map one of a first, tenth or twentieth frequency tone to the first resource. States of a system can be related to which tone is mapped to the first resource, providing additional system information to a receiver without requiring additional signaling resources. As an alternative example, the starting frequency tone of the coded signal can be mapped to different resources of the wireless signal. As a more particular example, the first frequency tone can be mapped to a first resource, a tenth resource or twentieth resource, to represent the three different states of the system. It should be appreciated that additional states can be conveyed by incorporating other offset states (e.g., a single offset can represent two states, three offsets can represent four states, and so on) in addition to the examples articulated above. Accordingly, the subject disclosure should not be limited to the above articulated examples; rather, other rate-matching modifications made known to one of skill in the art by way of the context provided herein are incorporated into the subject disclosure.

In another example, for instance in third generation partnership project long term evolution (3GPP LTE) or other suitable networks, modified rate-matching can be implemented to provide system data in conjunction with PDCCH blind decoding. With certain PDCCH payload sizes (e.g., 48 bit payload), multiple decoding hypothesis can be successfully decoded in some circumstances (e.g., where high SNR is observed at a receiver). Such a result can lead to selection of an incorrect hypothesis, causing problems in system operation. Accordingly, the disclosed subject matter can link modified rate-matching, such as a data offset described in more detail below, to the number of tones employed by a PDCCH. The modified rate-matching can be more readily identified by the mobile device, facilitating significant reduction in false alarms relating to the payload size of the PDCCH or other PDCCH-related system parameters.

By employing rate-matching data offsets, or other means for modified rate-matching, a broadcast data stream decoded at a user terminal can have very low correlation values to non-existent system states. Thus, even in high SNR environments, it can be very unlikely to decode an improper antenna configuration. Accordingly, by modified rate-matching, improved blind decoding is provided without requiring that additional signal resources be allocated to PBCH or downlink broadcast channel (DBCH) streams.

The techniques described herein may be used for various wireless communication systems such as CDMA, TDMA, FDMA, OFDMA, SC-FDMA (single carrier FDMA) and other systems. The terms "system" and "network" are often used interchangeably. A CDMA system may implement a radio technology such as Universal Terrestrial Radio Access (UTRA), CMDA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). LTE is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The blind decoding techniques described herein can be used for a system with sectorized cells as well as a system with multiple un-sectorized cells (e.g., a plurality of cells of a larger geographic area). For simplicity, in the following description, unless specified otherwise, the term "base station" is used generically for a fixed station that serves a sector as well as a fixed station that serves a cell. In addition, the term "cell" is used generically to refer to a geographic cell comprising multiple sectors, or a geographic area comprising multiple cells.

Terminals 120 are typically dispersed throughout the system, and each terminal 120 can be fixed or mobile. Terminals 120 can also be called a mobile station, user equipment, a user device, or some other terminology, as discussed above. A terminal 120 can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations. As used herein, a base station with which a terminal 120 maintains an active communication or an active registration is termed a "serving base station".

For a centralized architecture, a system controller 130 couples to base stations 110 and provides coordination and control for base stations 110. For a distributed architecture, base stations 110 can communicate with one another as needed (e.g., employing a backhaul network, not depicted). Data transmission on the forward link often occurs from one access point to one access terminal at or near the maximum data rate that can be supported by the forward link and/or the communication system. Additional channels of the forward link (e.g. control channel) can be transmitted from multiple access points to one access terminal. Reverse link data communication can occur from one access terminal to one or more access points.

Figure 2:
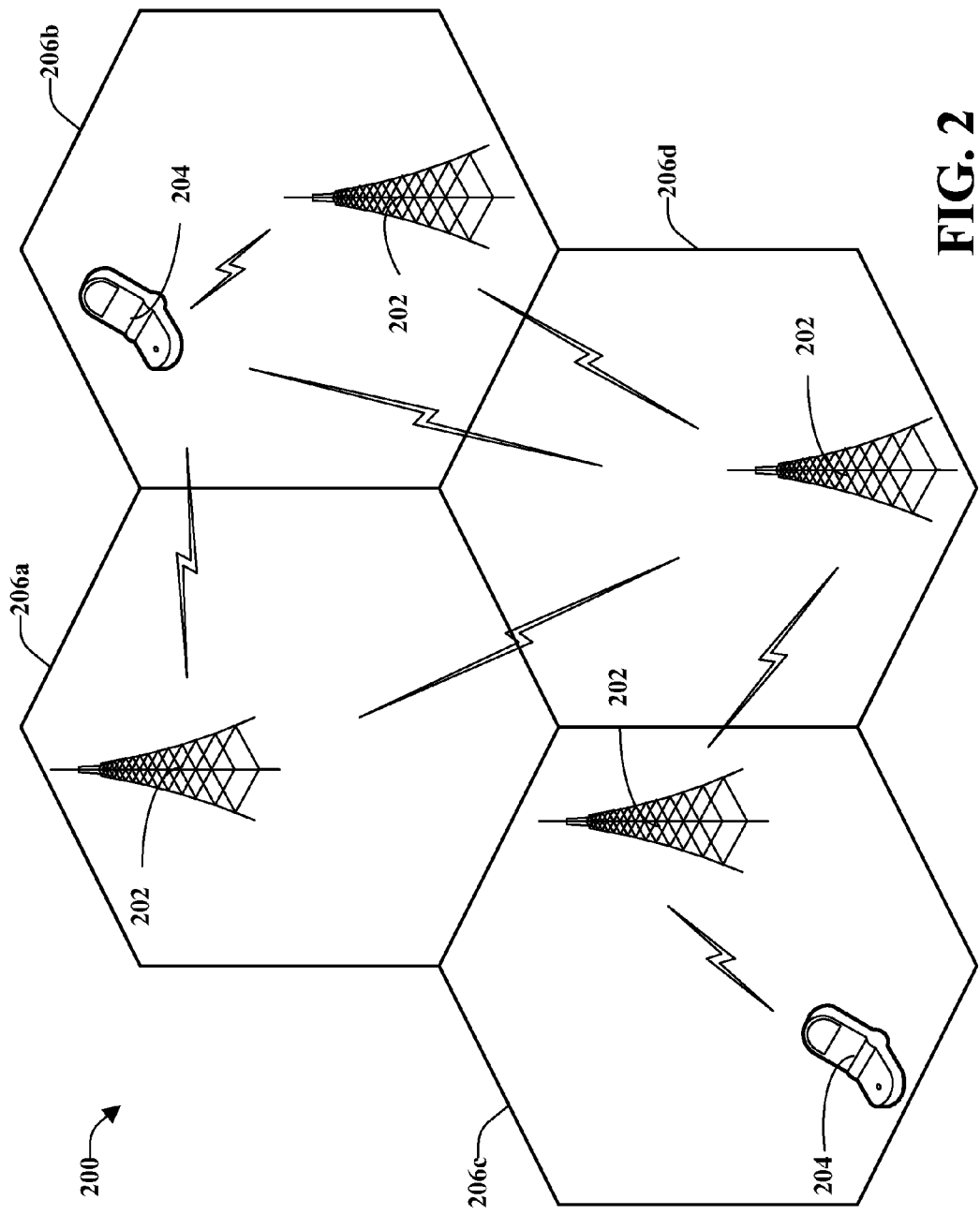
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more base stations 202 in one or more cells and/or sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device configured for wireless data exchange with a remote device. It should be appreciated that mobile devices 204 can also receive, transmit, repeat, etc., wireless communication signals to each other and/or to the one or more base stations 202 of system 200. System 200 can be employed in conjunction with various aspects described herein in order to facilitate detection of base stations and decoding system (200) configuration parameters, as set forth herein.

Figure 3:
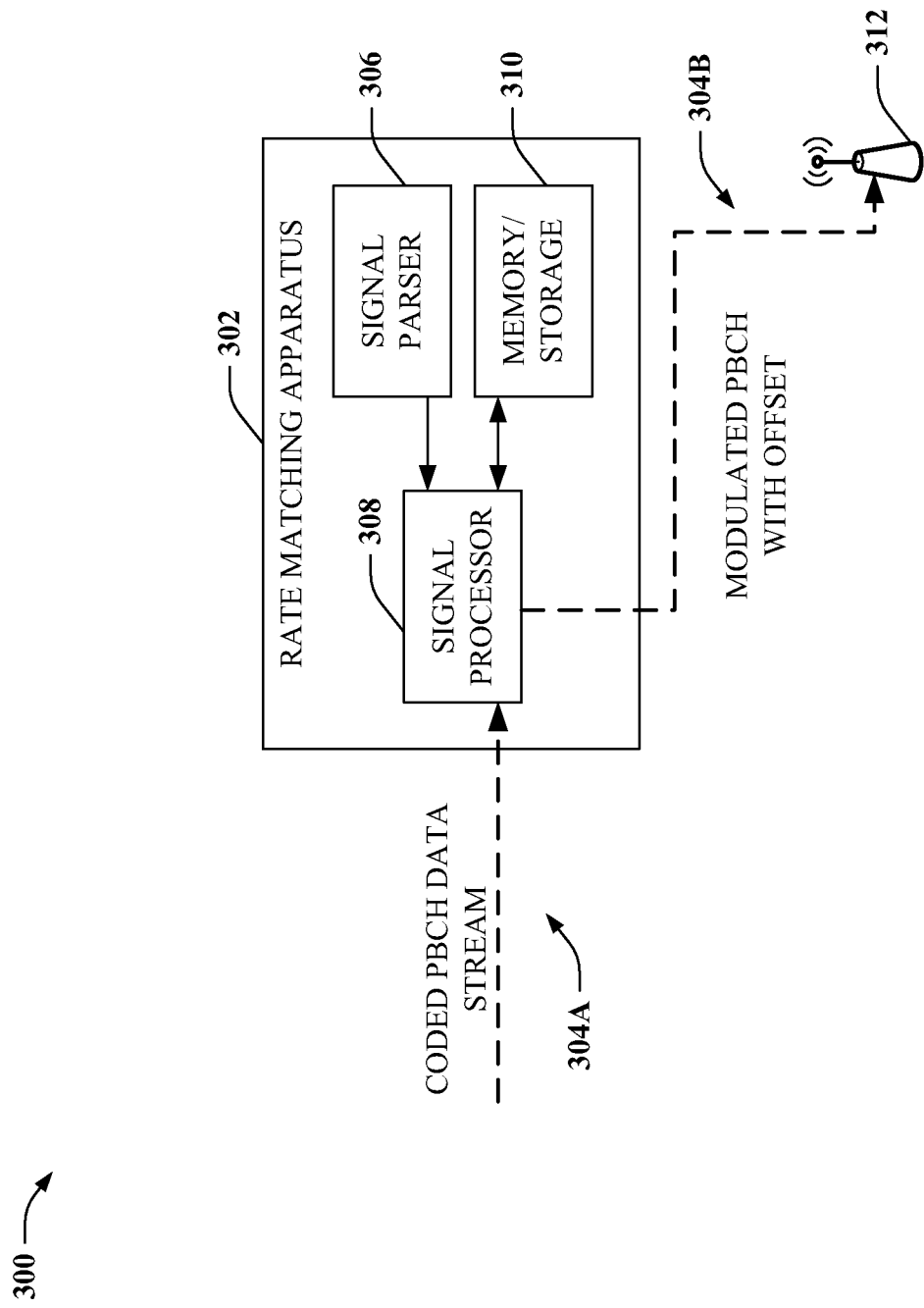
FIG. 3 illustrates a block diagram of an example system that conveys network system state utilizing modified rate-matching.

FIG. 3 illustrates a block diagram of an example system 300 that provides modified rate-matching to convey system information according to aspects of the subject disclosure. System 300 can comprise a rate-matching apparatus 302 that receives a coded broadcast data stream 304A (e.g., PBCH, DBCH, or the like) and outputs a modulated broadcast data stream 304B. In some aspects, the modulated output 304B can be modified as compared with a baseline output (e.g., see FIG. 4, infra) to represent different network states. Accordingly, a receiving device can identify a state of the system with great accuracy as compared with the baseline output only.

Resources of a modulated output stream 304B can be provided by a signal parser 304 that segments a wireless signal into multiple resources. Resources can comprise time, frequency or code divisions, sub-divisions thereof, or a combination of the foregoing or of the like, as suited to a particular communication network (e.g., CMDA or CDMA200, LTE, GSM, UMTS, etc.). A signal processor 306 can map bits of a coded bit stream 304A to the resources of the wireless signal provided by signal parser 304. In a typical baseline mapping, the first tone/code bit of the coded stream 304A is mapped to the first resource of the wireless signal, and subsequent bits of the coded stream 304A are mapped to consecutive resources of the wireless signal. In some cases, the data stream is mapped only to resources of the wireless signal that are allocated to a type of traffic, regardless if whether the resources are partially or wholly non-consecutive. Thus, for instance, if the data stream involves acquisition or synchronization data, signal processor 306 can map the tones/codes/bits to resources of the wireless signal allocated to acquisition or synchronization data, and skip resources not allocated to such data. As another example, if the data stream involves control channel information, signal processor 306 can map the tones/codes bits to resources of the wireless signal allocated to control channel information, skipping non-control channel resources in the mapping, and so on.

In modified rate-matching, signal processor 306 departs from the baseline mapping, described above, in a distinct manner. The modified mapping can comprise several states, which can be mapped to states of a network (e.g., transmit antenna configuration, position, orientation, number, etc.). By identifying distinct mapped states, a receiver can determine a particular network state with high probability.

One example of distinct mapping states can comprise one or more data offsets. The data offsets can be relative the coded data stream 304A, the modulated output data stream 304B, or a combination thereof. For instance, mapping a first tone/code/bit of the coded stream 304A to a first resource of the output stream 304B can comprise a baseline offset (e.g., a non-offset). Mapping a different tone/code/bit of the coded stream 304A other than the first (e.g., the second bit, fifth bit, tenth bit, etc.) to the first resource of the output stream 304B can represent a first non-baseline offset. Mapping a third bit, other than the first bit and different bit, of the coded stream 304A to the first resource of the output stream 304B can represent a second non-baseline offset, providing three offset states in total (e.g., baseline, first offset, second offset). In a general sense, the offsets can be represented by variables $Q_0$, $Q_1$ and $Q_2$ where the offset variables represent the bit/tone/code position of the coded stream 304A that is mapped to the first resource of the output stream 304B. Offsets can be stored in memory 310 for reference by the signal processor 308. Further, updated offset values $Q_0$, $Q_1$ and $Q_2$ can be written to the stored offsets to change data offset configurations (e.g., mapping of bits/tones/codes to resources) implemented by the signal processor 308. Further, memory 310 can store a modified rate-matching parameter specifying various types of rate-matching (e.g. offset relative the code stream 304A, offset relative the output stream 304B) to be employed by the signal processor 308. By updating the rate-matching parameter, signal processor 308 can switch from one type of modified rate-matching to another.

In an alternative example, data offsets can be relative the output stream 304B rather than the coded stream 304A. Thus, for example, a first bit/tone/code of the coded stream 304A can be mapped to the first resource of the output stream 304B for a baseline state. The first bit/tone/code of the coded stream 304A can be mapped to a different resource of the output stream 304B (e.g., second, third, etc.) to provide a first non-baseline state. Additionally, the first bit/tone/code of stream 304A can be mapped to a third resource, other than the first and different resources, of the output stream 304B to provide a second non-baseline state, three states in total. By providing data offsets in rate-matching the coded stream 304A to the modulated output stream 304B, a receiver can distinguish different system states of a decoded stream with greater accuracy than utilizing only a baseline state (e.g., non-offset state) with transmission parameters of the different system states (e.g., correlation values for single antenna, dual antenna and quad antenna configurations). It should be appreciated that the foregoing examples are not to be construed as limiting the disclosure to the aspects articulated above. Rather, various other data offset relations or mechanisms of modified rate-matching, known in the art or made known to one of skill in the art by way of the context provided herein, are contemplated as part of the subject disclosure.

Once modified rate-matching states are established by signal processor 308, network system states can be correlated to those rate-matching states. Thus, for instance, a number of transmit antennas, 1, 2, 4, etc., can be correlated to a like number of data offsets, baseline, first non-baseline, second non-baseline, etc. The correlation can be described in a rate-matching rules map stored in memory 310. Once the modified output signal 304B is generated, the signal can be provided to a transmitter 312 for transmission to remote terminals (not depicted). The remote terminals can also employ the rules map in decoding the signal once received. Thus, in decoding the wireless signal and determining a rate-matching state, a correlated system state (e.g., number of transmit antennas) can also be determined with reference to the rules map. Accordingly, system 300 can facilitate improved detection of transmitter 312 and, in some cases, improved communication quality, throughput and reliability as a result.

Figure 4:
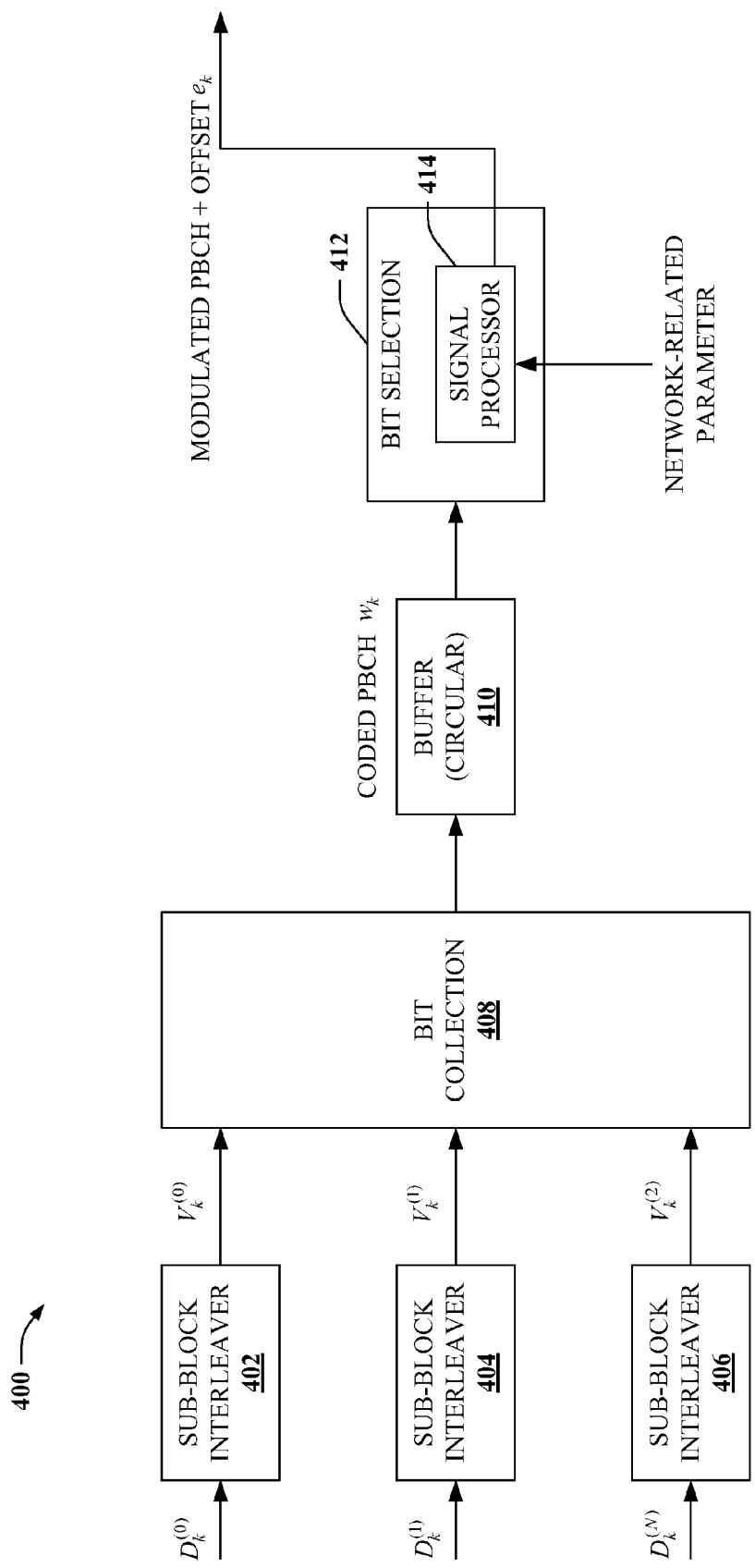
FIG. 4 depicts a block diagram of an example system providing modified rate-matching to convey network system state.

FIG. 4 illustrates a block diagram of an example system 400 that provides rate-matching for signal data streams in an E-UTRAN environment according to aspects of the subject disclosure. More specifically, system 400 can encode one or more input data streams and map a resulting coded data stream to a modulated output signal that can be transmitted by a wireless transmitter (e.g., as described by 3GPP TS Specification 36.212 v2.0.0 [2007-09], the entirety of which is incorporated herein by reference, and particularly sections 5.1.4.2, 5.1.4.2.1, and 5.1.4.2.2). It should be appreciated that aspects of the subject disclosure are applicable to other access network technologies, and the disclosure should not be limited to the particular E-UTRAN example described below.

As depicted at FIG. 4, 'N' broadcast channel input streams $D_k^{(0)}, D_k^{(1)}, \ldots, D_k^{(N)}$, where N is a positive integer, can be received at various sub-block interleavers 402, 404, 406. The input streams comprise k bits from 0, 1, . . . , k−1. The sub-block interleavers can encode the input streams to provide a number (e.g., N) of output streams. In one example, encoding can comprise generating a matrix having C columns (e.g., where C=32) and R rows, where R is an integer such that k≤(R×C). An input bit sequence ($D_k^{(0)}, D_k^{(1)}, D_k^{(N)}$, etc.) can be written to the R×C matrix row by row starting with $y_0$ in column 0 of row 0, such that $y_{N_d+k}=D_k^N$, where k=0, 1, . . . , d−1. The matrix can be described as indicated below:

$$\begin{bmatrix} y_0 & y_1 & y_2 & \cdots & y_{C-1} \\ y_C & y_{C+1} & y_{C+2} & \cdots & y_{2C-1} \\ \vdots & \vdots & \vdots & \ddots & \vdots \\ y_{(R-1)\times C} & y_{(R-1)\times C+1} & y_{(R-1)\times C+2} & \cdots & y_{(R\times C-1)} \end{bmatrix}$$

Next, an inter-column permutation can be performed on the R×C matrix. In one example, as indicated in the 3GPP TS 36.212 v 2.0.0 specification, the inter-column permutation can be based on the pattern $(P(j))_{j \in \{0, 1, \ldots, c-1\}}$ shown in Table 1 below:

TABLE 1

Example Inter-column permutation pattern for sub-block interleaver

| Number of columns C | Inter-column permutation pattern $<P(0), P(1), \ldots, P(C-1)>$ |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> |

According to the above pattern indicated by Table 1, an interleaved version of the above matrix can appear as follows:

$$\begin{bmatrix} y_{P(0)} & y_{P(1)} & y_{P(2)} & \cdots & y_{P(C-1)} \\ y_{P(0)+C} & y_{P(1)+C} & y_{P(2)+C} & \cdots & y_{P(C-1)+C} \\ \vdots & \vdots & \vdots & \ddots & \vdots \\ y_{P(0)+(R-1)\times C} & y_{P(1)+(R-1)\times C} & y_{P(2)+(R-1)\times C} & \cdots & y_{P(C-1)+(R-1)\times C} \end{bmatrix}$$

The permuted matrix can be read out column by column to generate an output sequence of the sub-block interleaver (402, 404, 406), $V_k^{(N)}$. Bits of the inter-leaved output sequence $V_k^{(N)}$ can be denoted by $V_0^{(N)}, V_1^{(N)}, V_2^{(N)}, \ldots, V_{K_\pi-1}^{(N)}$, where $V_0^{(N)}$ corresponds to $y_{P(0)}$, $V_1^{(N)}$ corresponds to $y_{P(0)}+C, \ldots,$ and $K\pi=(R\times C)$.

Bit collection block 408 can receive the output streams $V_k^{(1)}, V_k^{(2)}, V_k^{(N)}$ from sub-block interleavers 402, 404, 406 and aggregate the output streams into a single sequence $w_k$ at circular buffer 410. For some systems (e.g., E-UTRAN) the circular buffer can have length $K_w=3*K\pi$. Additionally, the sequence $w_k$ can be generated by the bit collection block 408 as follows:

$w_k = V_k^{(0)}$ for $k=0, \ldots, K\pi-1$ $w_{K_\pi+k} = V_k^{(1)}$ for $k=0, \ldots, K\pi-1$ $w_{N*K_\pi+k} = V_k^{(N)}$ for $k=0, \ldots, K\pi-1$ A bit selection module 412 can rate-match the signal $w_k$ to an output signal $e_k$ that is mapped to resources of a wireless signal and transmitted by a transmitter. To minimize similarity between multiple mobile network states, as described herein, a signal processor 414 can employ one or more modified rate-matching techniques that introduce distinct states into the output signal $e_k$. Such states can be correlated with one or more network-related parameters or network states. When detected by a receiver, the rate-matching states can be utilized to further identify a mobile network state of a mobile network transmitting the output signal $e_k$. In one particular example, signal processor 414 can introduce one or more data offsets correlated to one or more network-related parameters in rate matching signal $w_k$ to output signal $e_k$, as further described infra at FIG. 5.

Figure 5:
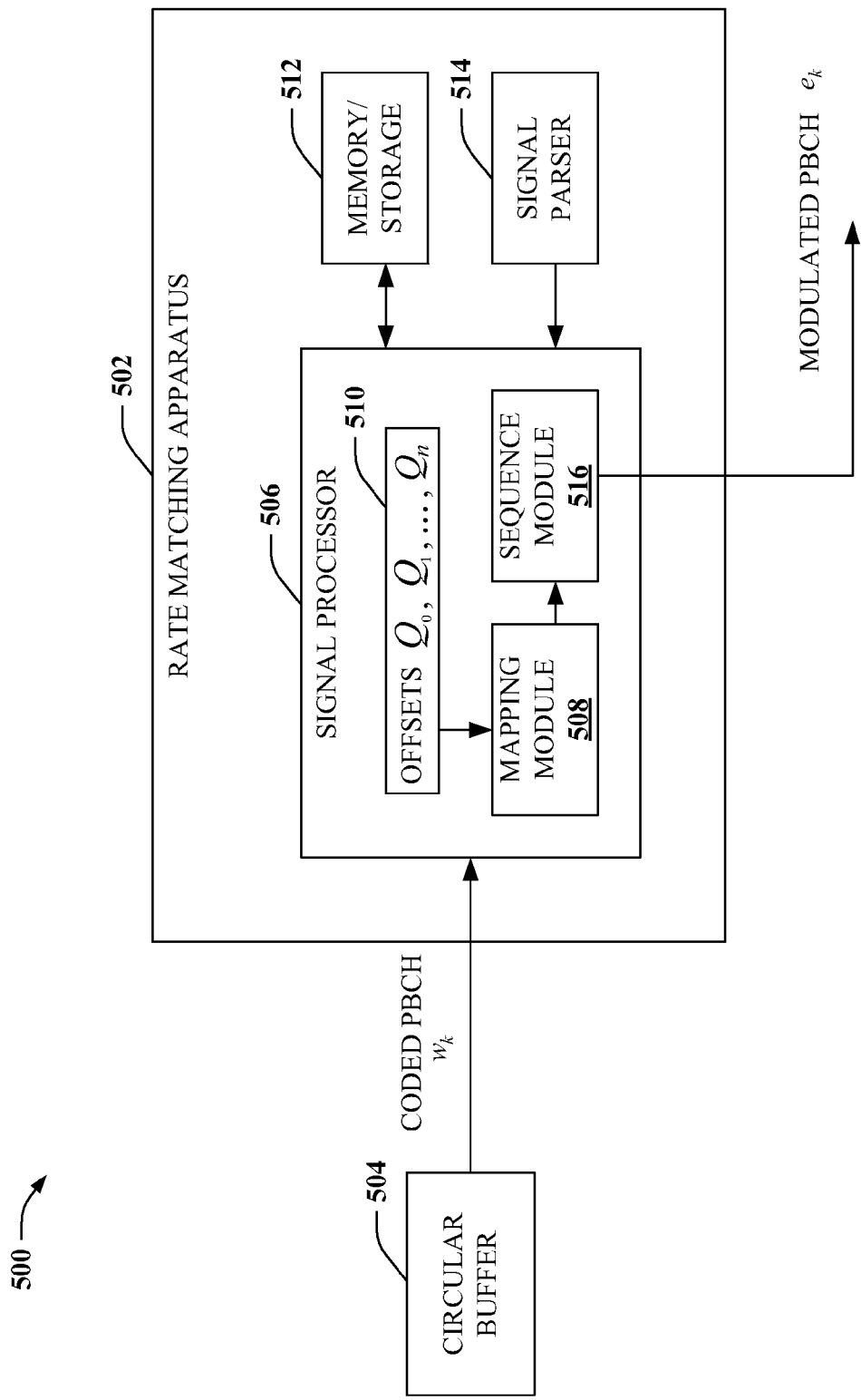
FIG. 5 illustrates a block diagram of an example rate-matching apparatus that conveys txmit antenna state via modified rate-matching of broadcast data streams.

FIG. 5 illustrates a block diagram of an example system 500 comprising a rate-matching apparatus 502 that conveys transmit antenna state via modified rate-matching of broadcast data streams. Rate matching apparatus 502 can receive a coded broadcast stream $w_k$ (e.g., generated as described supra with respect to FIG. 4) from a circular buffer 504. The coded broadcast stream is received at a signal processor 506. A mapping module 508 can employ one or more data offsets $Q_0, Q_1, \ldots, Q_n$, where n is a positive integer, and introduce those data offsets into the coded broadcast stream or an output stream $e_k$. For instance, the data offsets $Q_0, Q_1, \ldots, Q_n$ can represent different bits (e.g., a first bit, second bit, . . . , n-th bit) of the coded broadcast stream or different resources of the output stream (e.g., a first resource, second resource, . . . , n-th resource).

A sequence module 516 can map bits of the broadcast signal $w_k$ to output signal $e_k$ utilizing the data offsets 510 introduced by mapping module 508. In such a manner, at least one offset state can be encoded into the output signal. Such mapping can be accomplished by various mechanisms. For instance, when the offsets 510 relate to different bits of the coded broadcast stream, mapping one of the bits to the first resource of the output stream can convey one of n offset states. When the offsets 510 relate to different resources of the coded broadcast stream, mapping a first bit of the coded stream to one of the resources of the output stream can also convey one of n offset states. In addition to the foregoing, a combination of offset bits of the coded broadcast stream and offset resources of the output stream can be employed (e.g., by mapping one of n bits of the coded broadcast stream to one of n resources of the output stream) to provide substantially $n^2$ offset states. As described herein, these offset states can be correlated to network states, enabling identification of network states by decoding a particular offset state of a received signal. Data offsets $Q_0, Q_1, \ldots, Q_n$ 510 as well as network states, and correlations thereof, can be stored in memory 512. Further, a rate-matching type flag can indicate a type of rate-matching modification (e.g., coded stream offset, output stream offset, or a combination thereof) utilized by rate-matching apparatus 502.

In one aspect of the foregoing, sequence module 516 can implement the data offsets 510 by mapping bits of the coded broadcast channel to the output signal according to the following formula:

$$e_k = w_{j+A(\mu) \bmod K_w}$$

where $K_w = 3K_\P$, $K_\P$=length of $w_k$, $0 \leq k <$length of $e_k$, and where $w_{j \bmod K_w} \neq <\text{NULL}>$, and where $A(\mu)$ is the transmission antenna configuration, represented by different offset values, e.g. $Q_0, Q_1, Q_2$. Additionally, sequence module 516 can map output signal $e_k$ to resources of a wireless signal generated by signal parser 514 (e.g., as described at FIG. 3, supra). The wireless signal can be transmitted by a base station, wireless access point, or the like, to provide such signal to a receiving device. By decoding the received signal and identifying a rate-matching state encoded into the signal, the receiving device can determine a network state mapped to the identified rate-matching state. In blind decoding of transmit antenna configuration, for example, this technique can improve accurate determination of the transmit antenna configuration, enabling efficient utilizing of MIMO and other multi-antenna capabilities.

Figure 6:
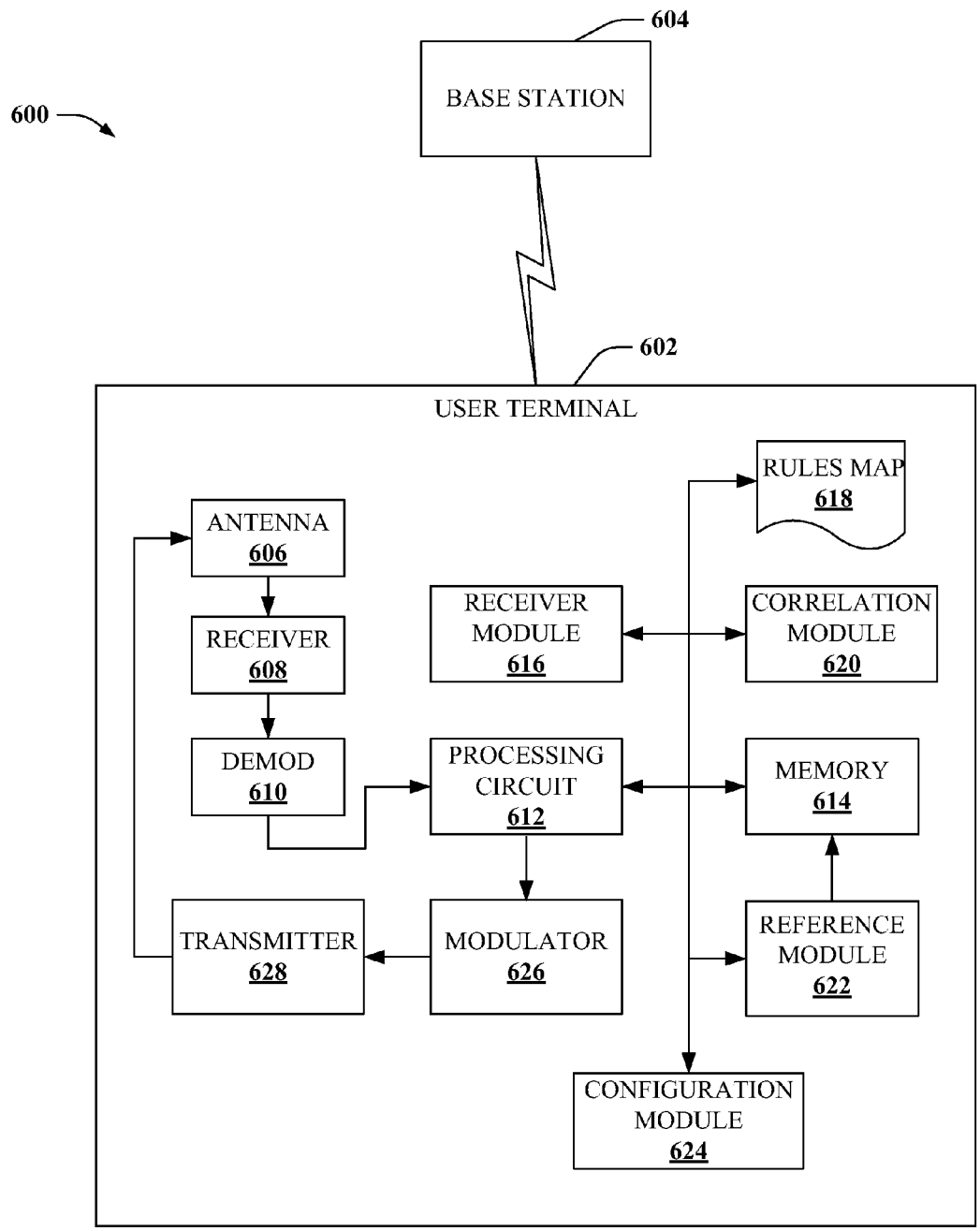
FIG. 6 depicts a block diagram of a sample user terminal (UT) configured to identity modified rate-matching of demodulated streams and determine network state.

FIG. 6 depicts a block diagram 600 of a sample user terminal (UT) 602 configured to obtain a wireless signal and decode system configuration information conveyed by the signal. In particular, UT 602 can identify a modified rate-matching state utilized to encode broadcast data to broadcast resources of the signal. By identifying the modified rate-matching state, a state of the system (e.g., number of transmitting antennas) can be determined.

In general, UT 602 can be configured to wirelessly couple with one or more remote transceivers 604 (e.g., access point, base station, peer node). UT 602 can receive wireless signals from such transceiver(s) 604 on a FL channel and respond with wireless signals on a RL channel, as known in the art. UT 602 includes at least one antenna 606 (e.g., a transmission receiver or group of such receivers comprising an input interface) that receives a signal (e.g., wireless message) and receiver(s) 608, which performs typical actions (e.g., filters, amplifies, down-converts, etc.) on the received signal. In general, antenna 606 and transmitter 628 (collectively referred to as a transceiver) can be configured to facilitate wireless data exchange with remote transceiver 604.

Antenna 606 and receiver(s) 608 can also be coupled with a demodulator 610 that can demodulate received symbols and provide them to a processing circuit 612 for evaluation. It should be appreciated that processing circuit 612 can control and/or reference one or more components (606, 608, 610, 614, 616, 618, 620, 622, 624, 626, 628) of the UT 602. Further, processing circuit 612 can execute one or more modules, applications, engines, or the like (616, 620, 622, 624) that comprise information or controls pertinent to executing functions of the mobile terminal 602. For instance, such functions can include demodulating received wireless signals, identifying modified rate-matching state(s) of the signal, correlating the state(s) to system state information, and configuring other components of the UT 602 according to such system state information.

Mobile terminal 602 can additionally include memory 616 that is operatively coupled to processing circuit 614. Memory 616 can store data to be transmitted, received, and the like, and instructions suitable to conduct wireless communication with remote transceiver(s) 604. Further, memory 616 can store the modules, applications, references, engines, etc. (614, 618, 620, 622) executed by processing circuit 614, above.

Additionally, UT 602 can comprise a receiver module 616 that can analyze broadcast data transmitted via a received wireless signal. The receiver module 616 can further determine one or more states of such data as defined by a rules map 618 stored in memory 614. The rules map 618 can include instructions that facilitate identifying rate-matching states of data mapped to resources of a wireless signal, as described herein. For instance, the rules map 618 can facilitate identification of a data offset introduced into a mapping of a broadcast data stream the wireless signal resources. In addition, the rules map 618 can include a correlation between distinct rate-matching states and network system states. Thus, as an example, one or more data offset states can be correlated to a number of transmit antennas utilized to transmit the wireless signal. A data offset state determined by receiver module 616 can be compared to rules map 618 by a correlation module 620, which can thereby ascertain the appropriate network state (e.g., a quad transmission antenna configuration). Once the appropriate network state is determined, a configuration module 624 can adjust, where beneficial, components of the UT 602 to correspond with the determined network state. Such an arrangement can result in more quickly determining existing network states and providing uniform and consistent communications between the UT 602 and transceiver 604. Thus, as a particular example, configuration module 624 can adjust antenna 606, receiver 608 and/or demodulator 610 as suitable for a single, dual or quad transmit antenna configuration determined by the correlation module 620.

According to some aspects of the disclosure, UT 602 can further comprise a reference module 622, which obtains rules map 618 from a portion of a received wireless signal, or of an additional wireless signal. For instance, a network could update relationships of network state and rate-matching state, to include additional network states or to provide a time-varying aspect for such rate-matching-network state relationships. Additionally, the network could update a mechanism utilized to generate the rate-matching states (e.g., employing a data offset with respect to bits of a coded stream, with respect resources of the output stream, or both). Thus, for the foregoing reasons or for other reasons or combinations of such reasons, the network can transmit a new or updated rules map (618) to some or all terminals served by the network (604). In some cases, a new/updated rules map (618) can be included with broadcast transmissions to all terminals. In other cases, such rules map (618) can be unicast to qualifying terminals or secure terminals.

Figure 7:
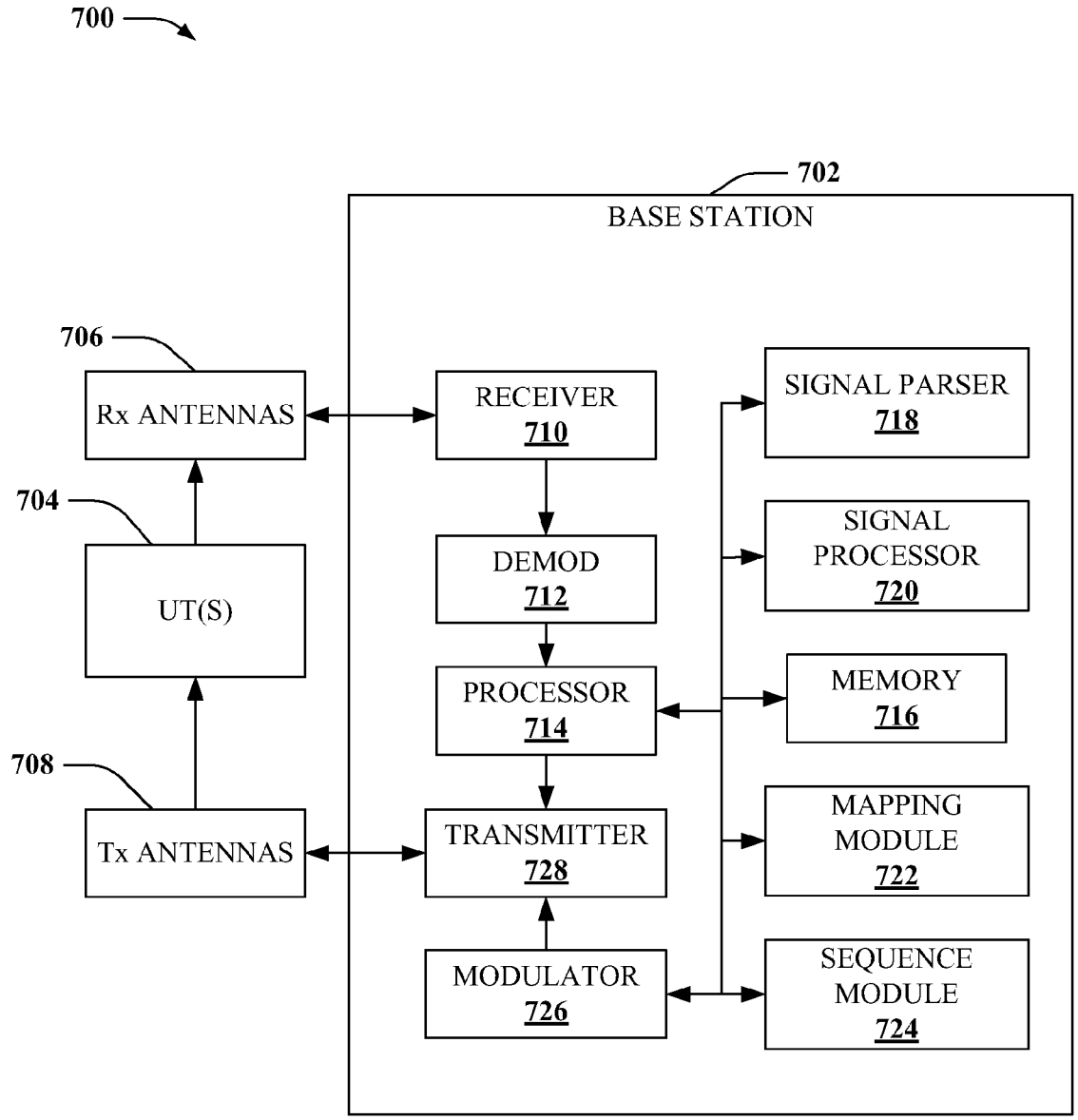
FIG. 7 illustrates a block diagram of an example base station that conveys transmission antenna configurations by employing rate-matching data offsets.

FIG. 7 illustrates a block diagram of a system 700 comprising a sample base station 702 that facilitates improved communication in a mobile network environment. In at least one aspect of the subject disclosure, base station 702 can convey mobile network states utilizing corresponding rate-matching states of broadcast data streams. In such a manner, the mobile network states can be distinguished utilizing existing broadcast channel resources of the wireless signal. Accordingly, in at least some aspects of the disclosure, system 700 can facilitate improved blind decoding of configuration states of the base station's (702) transmit antenna(s) 708.

Base station 702 (e.g. access point, . . . ) can comprise a receiver 710 that receives signal(s) from one or more user terminals 704 through a plurality of receive antennas 706, and a transmitter 728 that transmits modulated signals provided by modulator 726 to UT(s) 704 through transmit antenna(s) 708. Receiver 710 can receive information from receive antennas 706 and can further comprise a signal recipient (not shown) that receives uplink data transmitted by UT(s) 704. Additionally, receiver 710 is operatively associated with a demodulator 712 that demodulates received information. Demodulated symbols are analyzed by a processor 714, which also provides symbols to a modulator 730 for transmission. Processor 714 is coupled to a memory 716 that stores information related to functions provided by base station 702. In one instance, stored information can comprise protocols for obtaining and/or determining performance metrics of wireless communications with mobile devices 704. Particularly, the stored information can comprise rules for establishing distinguishable states for mapping broadcast data to resources of a wireless signal, correlating those states with system states, and transmitting such signal to remote devices (704).

Base station 702 further comprises a signal parser 718 that can segment a wireless signal into a plurality of resources. A signal processor 718 can map data to be transmitted by the base station 702 to a subset of the resources. In addition, signal processor 718 can convey wireless network system information by employing mapping of the data to the subset of resources. For instance, various mapping or rate-matching states can be implemented in rate-matching the data to such subset of resources. The rate-matching states can further be correlated to state of wireless network system. Accordingly, by mapping a particular state to the subset of resources, a particular network system state can also be conveyed with the signal. In at least one aspect of the disclosure, the rate-matching state can be a data offset introduced in mapping the data to the subset of resources, as described herein.

As a particular example of the foregoing, signal processor 720 can employ a mapping module 722 to introduce a data offset(s) into a transmitted signal. The mapping module 722 can write a first bit of a data stream to different bit positions (e.g., resources) of an output stream for different states of the network system. Alternatively, or in addition, the mapping module 722 can write different offset bits (e.g., second bit, third bit, etc.) of the data stream to the first bit position of the output stream for different states of the network system. Modulator 726 can then modulate the bits into the wireless signal for transmission by transmitter 728 and transmit antenna(s) 708. As a further example, the signal processor 720 and/or mapping module 722 can employ three distinct data offsets $Q_0$, $Q_1$, and $Q_2$, that correspond to a single transmit antenna (708) configuration, a dual transmit antenna (708) configuration and a quad transmit antenna (708) configuration, respectively. Additionally, the signal processor 718 can employ a sequence module to generate a rate-matching output sequence $e_k$ from a data stream sequence $w_k$ at least in part based on the following formula:

$$e_k = w_{j+A(\mu) \bmod K_w}$$

where $K_w = 3K_\P$, $K_\P$ = length of $w_k$, $0 \leq k <$ length of $e_k$, and where $w_{j \bmod K_w} \neq <\text{NULL}>$, and $A(\mu) = \{Q_0, Q_1, Q_2\}$.

By configuring an output stream according to different states (e.g., by employing different data offsets), additional information can be conveyed to UT(s) 704 utilizing existing signal resources. Additionally, one or more states of a mobile network can be likewise conveyed by correlating such network states with the states of the output stream. Thus, as one example, system 700 can provide improved blind decoding of transmit antenna configuration by UT(s) 704, facilitating efficient MIMO communication, for instance.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include rate matching apparatus 302, user terminal 602, and base station 702, or a different combination of these and other components. Submodules could also be implemented as modules communicatively coupled to other modules rather than included within parent modules. Additionally, it should be noted that one or more modules could be combined into a single module providing aggregate functionality. For instance, mapping module 508 can include sequence module 416, or vice versa, to facilitate introducing data offsets into a coded broadcast stream and generating an output stream by way of a single module. The modules can also interact with one or more other modules not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
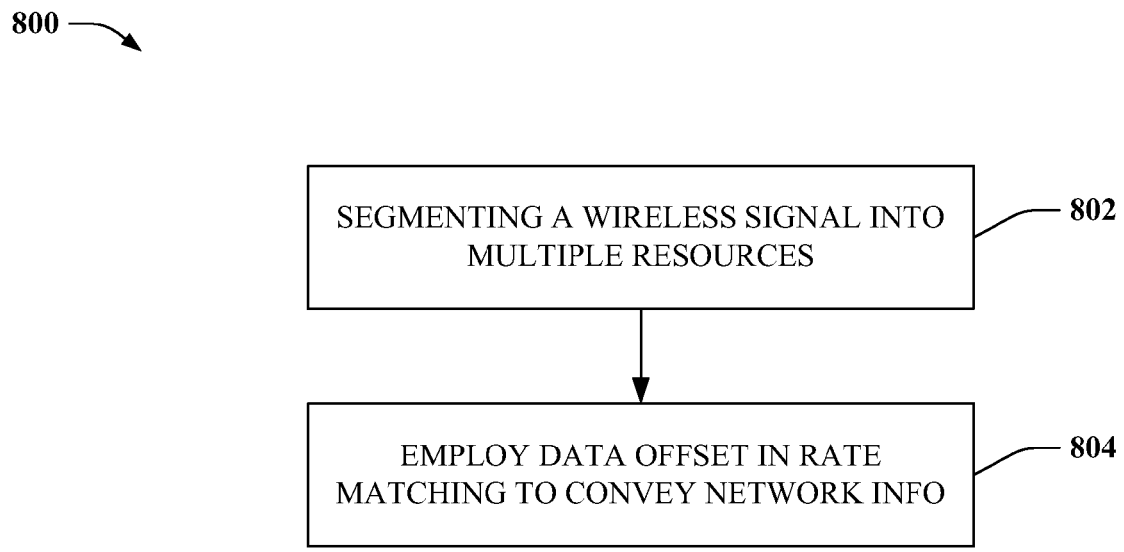
FIG. 8 depicts a flowchart of an example methodology for conveying network state by modified rate-matching of broadcast data streams.

FIG. 8 depicts a flowchart of an example methodology 800 for conveying network state by modified rate-matching of broadcast data streams. At 802, method 800 can segment a wireless signal into multiple resources. The resources can be time-based resources, frequency-based resources, symbol-based resources, code-based resources or the like, or a combination thereof. The resources can be utilized to transmit analog and/or digital information mapped to such resources (e.g., upon transmission by a transmission antenna).

At 804, method 800 can convey wireless network system information by employing at least one distinct data state in rate-matching a data stream to resources of the wireless signal. The distinct data state(s) can comprise a data offset implemented in conjunction with resources of the wireless signal reserved for broadcast data, synchronization data, acquisition or synchronization data, traffic data or a combination thereof. In at least one aspect of the disclosure, the data state(s) can comprise mapping an offset bit(s) (e.g., 0+Q bit, where Q is a positive integer) of the data stream to a first resource of the wireless signal, or vice versa. In some aspects, a combination of offset data stream bits and offset signal resources can be employed to introduce additional states. By correlating state of the network system to one or more distinct data states, the network information can be transmitted employing existing allocation of resources. Thus, a substantial benefit can be provide in, for instance, blind decoding transmit antenna configuration at a remote terminal, as described herein.

Figure 9:
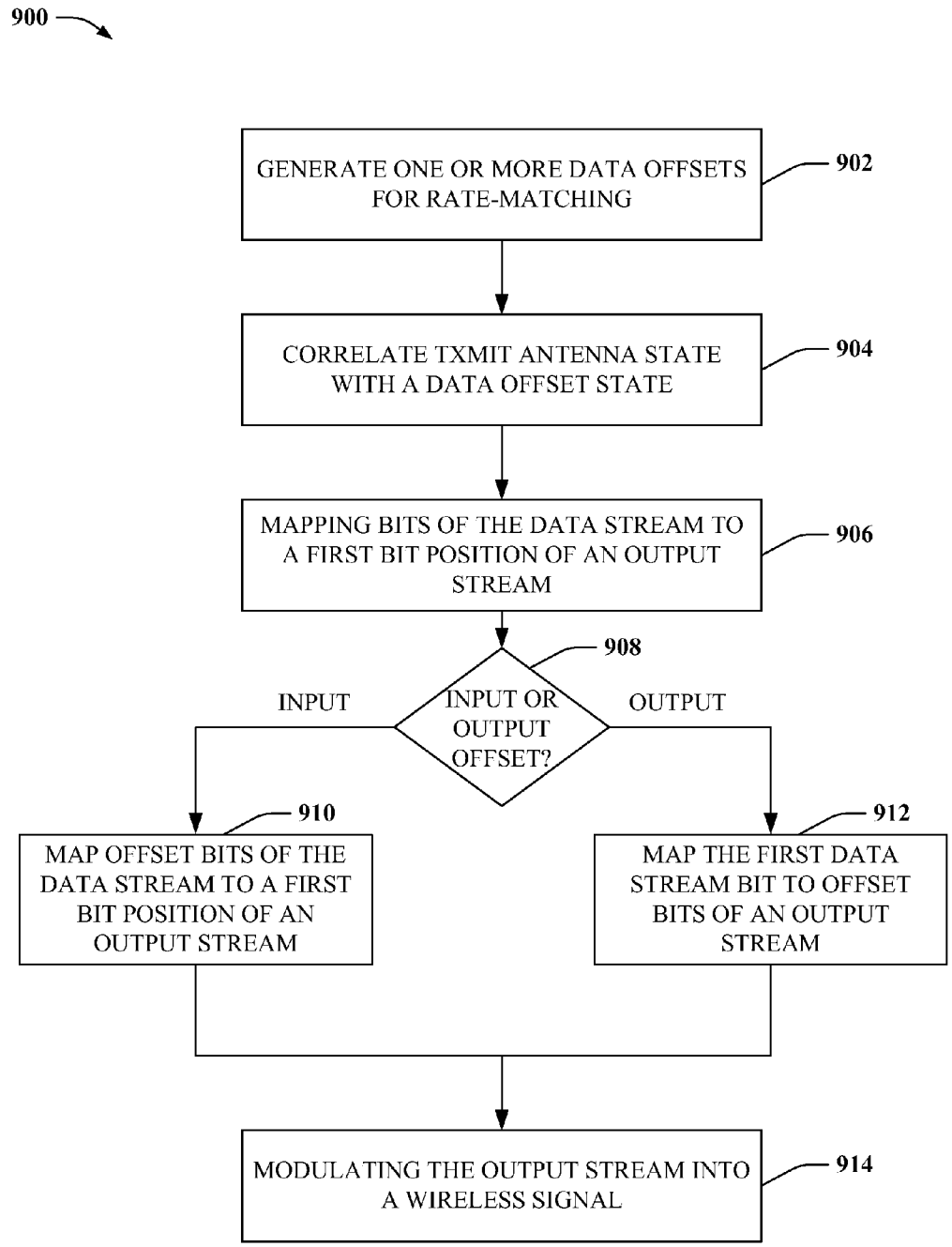
FIG. 9 illustrates a flowchart of an example methodology for broadcasting txmit antenna configuration via modified rate-matching of broadcast data streams.

FIG. 9 illustrates a flowchart of an example methodology 900 for broadcasting transmit antenna configuration via modified rate-matching of broadcast data streams. At 902, method 900 can generate one or more data offsets for rate-matching broadcast data to resources of a wireless signal. The data offsets can be in relation to bits of a broadcast data stream, in relation to resources of the wireless signal, or both. Each data offset can provide a distinct data offset state in the wireless signal. At 904, method 900 can correlate a distinct transmit antenna configuration state to a data offset state. At 906, bits of the data stream can be mapped to bit positions of an output stream. At 908, a determination is made as to whether an input offset or output offset is utilized. The determination can be made with reference to a stored rate-matching parameter, for instance. If an input offset, method 900 can proceed to 910; otherwise, method 900 can proceed to 912.

At 910, method 900 maps offset bits of the data stream to a first bit position of the output stream. Thus, for instance, a 0+Qth bit, where Q is a positive integer, is mapped to the first bit position. Accordingly, each value of Q provides a distinct state of the output stream. At 912, method 900 instead maps the first bit of the data stream to offset bit positions of the output stream. Thus, for instance, the first bit can be mapped to a 0+Jth bit position, where J is a positive integer. Thus, each value of J also provides a distinct state of the output stream.

At 914, method 900 can modulate the output stream into a wireless signal. The signal can be transmitted to remote terminal devices. In some aspects, the wireless signal, or a related signal, can provide the correlation between data offset state(s) and network configuration state(s). Accordingly, a terminal capable of demodulating the wireless signal and identifying the data offset state(s) can also identify the correlated network configuration state(s). Method 900 provides a significant advantage for conveying network state information because current signal resources can be utilized; the wireless signal does not have to allocate resources utilized by other functions of the network to convey the state information.

Figure 10:
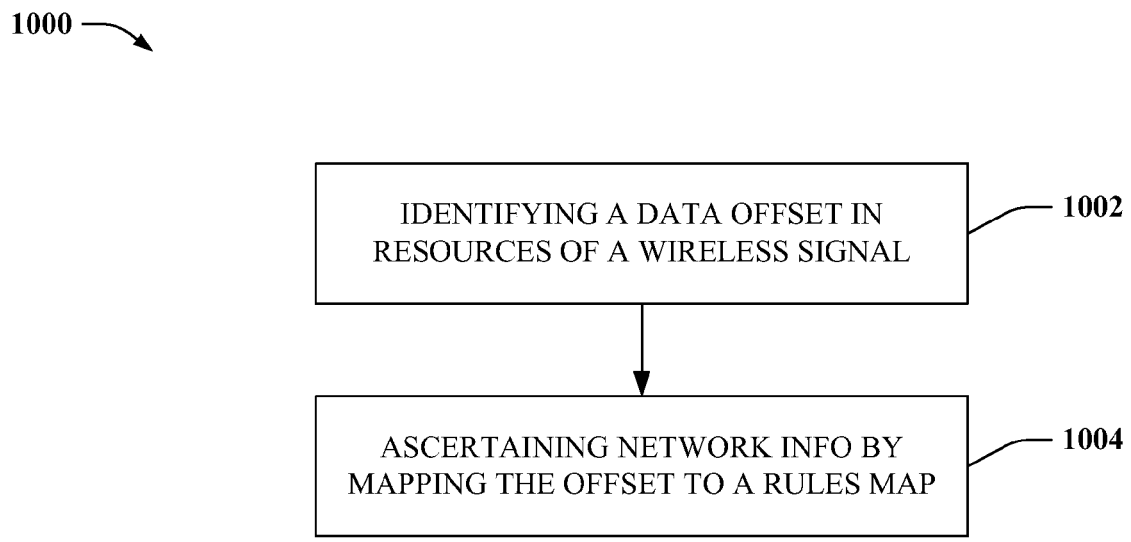
FIG. 10 depicts a flowchart of an example methodology for identifying modified rate-matching and extracting txmit system state at a receiver.

FIG. 10 depicts a flowchart of an example methodology 1000 for identifying modified rate-matching and extracting transmit system state at a receiver. At 1002, method 1000 can identify a distinct data state in resources of a wireless signal. The state can be related to rate-matching a data stream (e.g., comprising broadcast data, unicast data, synchronization/acquisition data, control data, traffic data, and so on) into an output stream suitable for transmission. As described herein, the data states can be generated by employing one or more data offsets in rate-matching the data stream to the output stream.

At 1004, method 1000 can ascertain network information by mapping the distinct data state to a rules map that correlates data state(s) and network state(s). Thus, for instance, if a particular data offset state is identified at reference number 1002 (e.g., a $Q_0$ state, where a $0^{th}$ bit of the data stream is mapped to a $0^{th}$ bit position of the output stream), the rules map can be referenced to determine whether a particular system state(s) is associated with the identified data offset state. If so, additional signals can be analyzed, demodulated, conditioned, etc., based on parameters associated with the particular system state(s). Additionally, by employing data offset as the distinct data state, significant state distinction can be provided at the receiving device, resulting in great probability that the system state(s) will be decoded properly. Thus, method 1000 can generally improve reliability of wireless communications.

Figure 11:
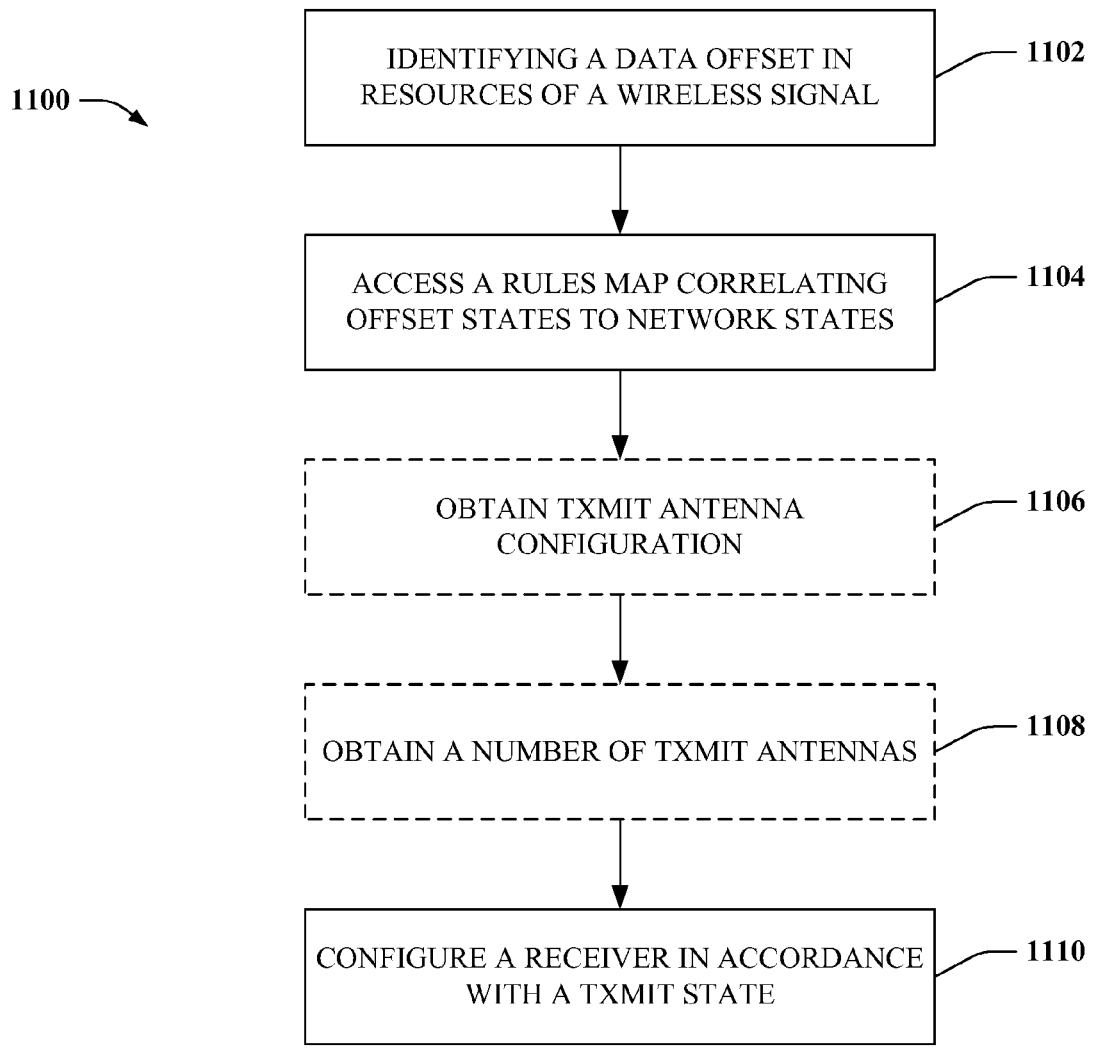
FIG. 11 illustrates a flowchart of a sample methodology for blind decoding of txmit antenna configuration via identifying data offsets in demodulated data streams.

FIG. 11 illustrates a flowchart of a sample methodology 1100 for blind decoding of transmit antenna configuration via identifying data offsets in demodulated data streams. At 1102, method 1100 can identify a data offset in resources of a received wireless signal. At 1104, method 1100 can access a rules map that correlates network system states to data offset states. At 1106, method 1100 can optional obtain transmit antenna configuration information based on the data offset and the rules map. Alternatively, at 1108, method 1100 can obtain a number of transmission antennas (e.g., in conjunction with a MIMO system) utilized by a base station of the network. At 1110, method 1100 can configure a receiver in accordance with the antenna configuration/number of transmission antennas. Accordingly, the receiver can be configured for uniform and homogenous communication with various network system configurations by employing method 1100.

Figure 12:
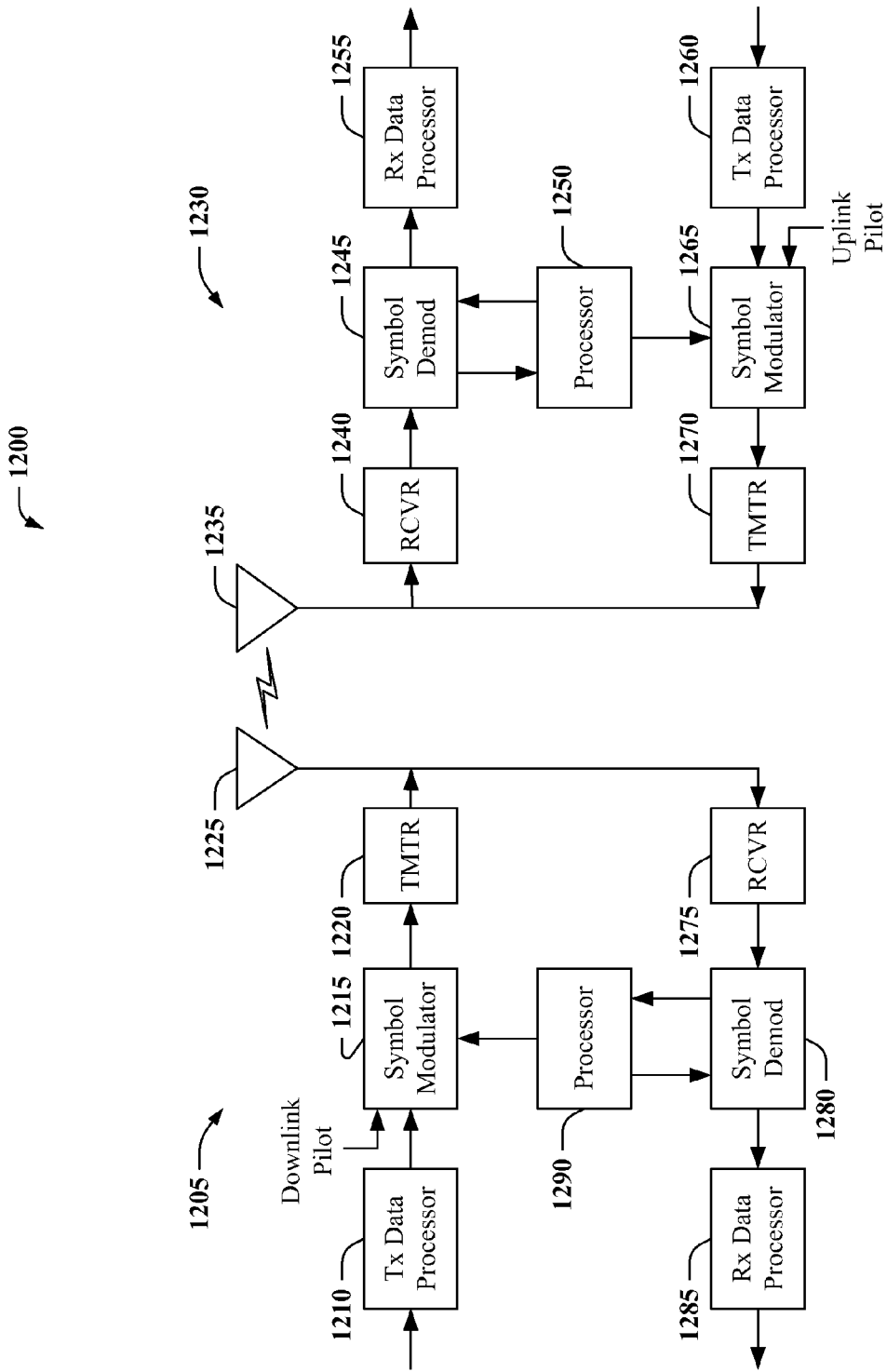
FIG. 12 illustrates a block diagram of an example system that provides wireless communication between remote devices according to aspects disclosed herein.

FIG. 12 depicts a block diagram of an example system 1200 that can facilitate wireless communication according to some aspects disclosed herein. On a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. The symbol modulator 1215 multiplexes data and pilot symbols and provides them to a transmitter unit (TMTR) 1220. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205. Specifically, the uplink signal can be in accordance with SC-FDMA requirements and can include frequency hopping mechanisms as described herein.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals can transmit pilot concurrently on the uplink on their respective assigned sets of pilot subbands, where the pilot subband sets can be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof, as described herein. Software codes can be stored in physical memory (not depicted) or virtual memory and executed by the processors 1290 and 1250.

Figure 13:
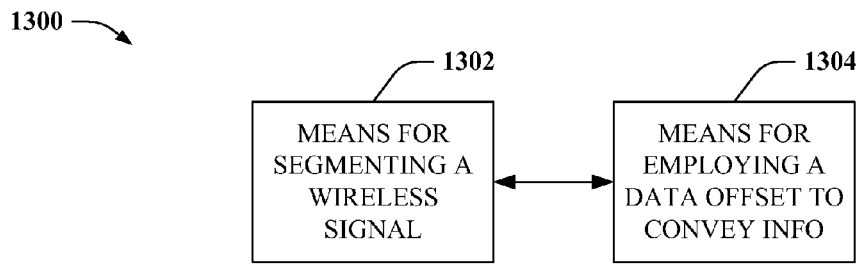
FIG. 13 depicts a block diagram of an example system that conveys system information utilizing modified rate-matching according to aspects of the disclosure.
Figure 14:
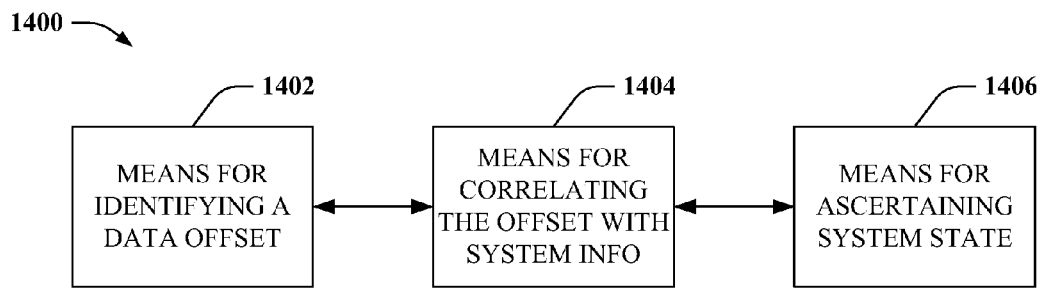
FIG. 14 illustrates a block diagram of an example system that blind decodes txmit antenna state according to modified rate-matching of received signals.

FIGS. 13 and 14 depict block diagrams of example systems 1300, 1400 that conveys and decode, respectively, network system information utilizing modified rate-matching techniques of the subject disclosure. For example, systems 1300, 1400 can reside at least partially within a wireless communication network and/or within a transmitter such as a node, base station, access point, or the like. It is to be appreciated that systems 1300, 1400 are represented as including functional blocks, which can be functional blocks that represent functions implemented by a processor, software, or combination thereof (e.g., firmware).

Turning specifically to system 1300, a first module 1302 for segmenting a wireless signal is provided. The module can employ various time, frequency, code, symbol or like divisions of the wireless signal to provide multiple signal resources. Each resource can be utilized to wirelessly transmit information. Additionally, groups of resources can be allocated to categories of information, such as traffic, control, synchronization/acquisition, or like information, or combinations thereof. Accordingly, a receiving device can analyze a predetermined group of data to find information with a category associated with such group (e.g., control channel information can be accessed by analyzing a group of resources allocated to control channel information, and so on).

Additionally, system 1300 comprises a second module 1304 for employing a data offset state to convey network information. The module 1304 can implement the data offset state in conjunction with rate-matching a coded stream of data into an output stream suitable for mapping to a resource(s) of the wireless signal. The data offset state can further be correlated with a state of the network, such that the wireless signal inherently can convey the network state based on the above rate-matching. Thus, system information can be conveyed utilizing existing allocation of signal resources, to minimize effects on existing control, acquisition and traffic data.

In regard to system 1400, a first module 1402 is provided for identifying a data offset state in a received wireless signal. The module can employ a rules map that contains instructions for identifying the offset state from demodulated data streams of the received signal. Additionally, a second module 1404 is provided for correlating the offset state with system information. Thus, for instance, the module 1404 can comprise the above rules map which can also relate network configuration state and offset state. In some aspects of the subject disclosure, the module 1404 can also obtain an updated rules map from the wireless signal or a related signal (e.g., a unicast message transmitted to a receiver device associated with system 1400). Accordingly, changes in network state-offset state correlations and/or instructions for identifying offset state can be obtained and stored in memory (not depicted) associated with system 1400.

In addition to the foregoing, system 1400 can comprise a third module 1406 for ascertaining a system state. Such module 1406 can utilize the data offset obtained by the first module 1402 and reference the second module 1406 to identify a system network state associated with the data offset. Additionally, module 1406 can configure wireless reception components associated with system 1400 (or, e.g., the receiving device associated with system 1400) to operate in accordance with parameters suitable for the identified system state. Thus, system 1400 can facilitate uniform and homogenous wireless communications for disparate mobile network states.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communications operational on an access point in a network system, comprising:
segmenting a wireless signal into multiple resources; and
conveying transmission antenna configuration of the access point to a terminal by employing at least one distinct data offset in rate matching a data stream to resources of the segmented wireless signal, wherein the at least one distinct data offset represents a distinct transmission antenna configuration of the access point;
wherein employing the at least one distinct data offset in rate matching further comprises writing a first bit of the data stream to different bit positions of an output stream for different transmission antenna configurations states of the access point the output stream mapped to the resources of the wireless signal.

2. The method of claim 1, further comprising employing multiple bit sequences of a primary broadcast channel (PBCH) as the data stream.

3. The method of claim 1, further comprising conveying a number of transmit antennas of the access point by employing the at least one distinct data offset.

4. The method of claim 1, wherein employing the at least one distinct data offset in rate matching further comprises mapping different bits of the data stream to a first bit position of an output stream for different transmission antenna configurations of the access point, the output stream mapped to the resources of the wireless signal.

5. The method of claim 4, further comprising writing to the first bit position of the output stream at least one of:
an N1-th bit of the data stream for a first transmit antenna configuration;
an N2-th bit of the data stream for a second transmit antenna configuration; or
an N3-rd bit of the data stream for a third transmit antenna configuration,
where N1, N2, and N3 represent different bits of the data stream.

6. The method of claim 1, further comprising employing three distinct data offsets as the at least one distinct data offset, wherein the three distinct data offsets represent a number of transmission antenna configurations as follows:

$$A(\mu) = \begin{cases} Q_0 - 1 \text{ Transmission Antenna} \\ Q_1 - 2 \text{ Transmission Antennas} \\ Q_2 - 4 \text{ Transmission Antennas} \end{cases}$$

where $Q_0$, $Q_1$, and $Q_2$ comprise different values.

7. The method of claim 6, further comprising generating a rate matching output sequence $e_k$ that is written to the resources of the wireless signal, the rate matching output sequence generated from a data stream sequence $w_k$ employing, at least in part, the following formula:

$$e_k = w_{j+A(\mu) \bmod K_w}$$

where $K_w = 3K_\Pi$, $K_\Pi$=length of $w_k$, $0 \le k <$a length of $e_k$, and where $w_{j \bmod K_w} \ne <\text{NULL}>$.

8. An access point configured for wireless communications in a network system, comprising:
a signal parser that segments a wireless signal into multiple resources;
a signal processor that conveys transmission antenna configuration of the access point to a terminal information by employing at least one distinct data offset in rate matching a data stream to resources of the segmented wireless signal, wherein the at least one distinct transmission antenna configuration of the access point; and
memory coupled to the signal processor;
wherein further comprising a mapping module that writes a first bit of the data stream to different bit positions of an output stream for different transmission antenna configurations of the access point wherein the output stream is modulated into the resources of the wireless signal.

9. The access point of claim 8, the signal processor employs multiple bit sequences of a primary broadcast channel (PBCH) as the data stream.

10. The access point of claim 8, wherein the signal processor conveys a number of transmit antennas of the access point by employing the at least one distinct data offset.

11. The access point of claim 8, further comprising:
a mapping module writes different bits of the data stream to a first bit position of an output stream for different transmission antenna configurations of the access point,
wherein the signal processor modulates the output stream into the resources of the wireless signal.

12. The access point of claim 11, wherein the mapping module writes to the first bit position of the output stream at least one of:
an N1-th bit of the data stream for a first transmit antenna configuration;
an N2-th bit of the data stream for a second transmit antenna configuration; or
an N3-rd bit of the data stream for a third transmit antenna configuration,
where N12, N2 and N3 represent different bits of the data stream.

13. The access point of claim 8, wherein the signal processor employs three distinct data offsets as the at least one distinct data offset, and wherein the three distinct data offsets represent a number of transmission antenna configurations as follows:

$$A(\mu) = \begin{cases} Q_0 - 1 \text{ Transmission Antenna} \\ Q_1 - 2 \text{ Transmission Antennas} \\ Q_2 - 4 \text{ Transmission Antennas} \end{cases}$$

where $Q_0$, $Q_1$, and $Q_2$ comprise different values.

14. The access point of claim 13, further comprising a sequence module that generates a rate matching output sequence $e_k$, written to the resources of the wireless signal, from a data stream sequence $w_k$ at least in part by employing the following formula:

$$e = w_{j+A(\mu) \bmod K_w}$$

where $K_w = 3K_\Pi$, $K_\Pi$=length of $w_k$, $0 \le k <$a length of $e_k$, and where $w_{j \bmod K_w} \ne <\text{NULL}>$.

15. An access point configured for wireless communications in a network system, comprising:
means for segmenting a wireless signal into multiple resources; and means for conveying transmission antenna configuration of the access point to a terminal wireless by employing at least one distinct data offset in rate matching a data stream to resources of the segmented wireless signal, wherein the at least one distinct data offset represents a distinct transmission antenna configuration of the access point network;

wherein employing the at least one distinct data offset in rate matching further comprises writing a first bit of the data stream to different bit positions of an output stream for different transmission antenna configurations states of the access point the output stream mapped to the resources of the wireless signal.

16. A processor operational on an access point configured for wireless communications in a network system, comprising:
   a first module that segments a wireless signal into multiple resources; and
   a second module that conveys transmission antenna configuration of the access point to a terminal by employing at least one distinct data offset in rate matching a data stream to resources of the segmented wireless signal, wherein the at least one distinct data offset represents a distinct transmission antenna configuration of the access point wherein further comprising a mapping module that writes a first bit of the data stream to different bit positions of an output stream for different transmission antenna configurations of the access point wherein the output stream is modulated into the resources of the wireless signal.

17. A non-transitory computer-readable storage media, comprising:
   a computer program product comprising code for:
   segmenting a wireless signal into multiple resources; and
   conveying transmission antenna configuration of the access point to a terminal by employing at least one distinct data offset in rate matching a data stream to resources of the segmented wireless signal, wherein the at least one distinct data offset represents a distinct transmission antenna configuration state of the access point;
   wherein employing the at least one distinct data offset in rate matching further comprises writing a first bit of the data stream to different bit positions of an output stream for different transmission antenna configurations states of the access point the output stream mapped to the resources of the wireless signal.

* * * * *